US011898125B2

(12) United States Patent
Smith

(10) Patent No.: US 11,898,125 B2
(45) Date of Patent: Feb. 13, 2024

(54) COMPOSITION FOR AN ORGANIC CLEANING PRODUCT

(71) Applicant: Nicole Smith, Henderson, NV (US)

(72) Inventor: Nicole Smith, Henderson, NV (US)

( * ) Notice: Subject to any disclaimer, the term of this patent is extended or adjusted under 35 U.S.C. 154(b) by 408 days.

(21) Appl. No.: 17/307,775

(22) Filed: May 4, 2021

(65) Prior Publication Data

US 2022/0033742 A1 Feb. 3, 2022

Related U.S. Application Data

(60) Provisional application No. 63/057,357, filed on Jul. 28, 2020.

(51) Int. Cl.

| | |
|---|---|
| ***C11D 3/382*** | (2006.01) |
| ***C11D 3/50*** | (2006.01) |
| ***C11D 7/08*** | (2006.01) |
| ***C11D 9/16*** | (2006.01) |
| ***C11D 9/00*** | (2006.01) |
| ***C11D 11/00*** | (2006.01) |
| ***C11D 9/38*** | (2006.01) |
| ***C11D 9/26*** | (2006.01) |

(52) U.S. Cl.

CPC ................ *C11D 9/002* (2013.01); *C11D 9/16* (2013.01); *C11D 9/26* (2013.01); *C11D 9/38* (2013.01); *C11D 11/0023* (2013.01); *C11D 11/0064* (2013.01)

(58) Field of Classification Search

CPC ..... C11D 3/042; C11D 3/2075; C11D 3/2079; C11D 3/382; C11D 3/50; C11D 7/08; C11D 7/265; C11D 9/16; C11D 11/0064

See application file for complete search history.

(56) References Cited

U.S. PATENT DOCUMENTS

| | | | |
|---|---|---|---|
| 3,798,181 A | 3/1974 | Vazquez | |
| 6,265,370 B1 | 7/2001 | Newbegin | |
| 7,741,261 B1 | 6/2010 | Guerrero | |
| 7,910,532 B2 | 3/2011 | Johnson et al. | |
| 8,389,461 B1 * | 3/2013 | Dudley .................. | C11D 3/188 510/428 |
| 8,802,163 B2 | 8/2014 | Ko | |
| 9,447,366 B2 | 9/2016 | McCarthy et al. | |

* cited by examiner

*Primary Examiner* — Brian P Mruk

(74) *Attorney, Agent, or Firm* — Suzanne Kikel, Patent Agent

(57) ABSTRACT

A natural cleaning product which does not contain any harsh chemicals or toxins. Specifically, the cleaning product is based on borax and yucca plant products. A composition for an organic cleaning product comprises distilled water; borax; distilled white vinegar; yucca root soap; and optionally, lavender essential oil, peppermint essential oil; and eucalyptus. Also disclosed is a process for the production of yucca root soap which is used in producing the organic cleaning product of the invention.

8 Claims, No Drawings

COMPOSITION FOR AN ORGANIC CLEANING PRODUCT

CROSS REFERENCE TO RELATED APPLICATIONS

This application claims priority to U.S. Provisional Patent Application Ser. No. 63/057,357 filed Jul. 28, 2020, entitled "Simply Organic Cleaning Products", the disclosure of which is incorporated herein by reference in its entirety.

BACKGROUND OF THE INVENTION

1. Field of the Invention

The present invention relates, in general, to cleaning products, and, more particularly, to a cleaning product that does not contain any harsh chemicals or toxins. More particularly, the invention relates to a composition for an organic cleaning product.

2. Brief Description of the Prior Art

General purpose cleaning compositions are, in general, intended for cleaning hard surfaces, such as tiles, walls, floors, kitchen furniture, glass, plastic-covered doors, etc. Such general-purpose cleaning compositions are well-known in the art and have found substantial commercial use.

These general-purpose cleaning compositions are often provided in the form of a particulate composition from which the user prepares an aqueous solution; or in the form of a liquid composition which contains a suitable solvent, such as water, or an organic solvent, or a mixture thereof. These liquids can be applied undiluted for the removal of stubborn stains, or they may be applied in the form of a diluted solution for large surface area cleaning.

The development and progression of cleaning formulations have always been focused on meeting the demands of the consumer. In the interest of always improving on previous cleaning formulations, in the past, most cleaners have been created using an increasing number of synthetic surfactants and solvents. While such synthetically formulated cleaners may be extremely effective in killing germs and cleaning surfaces, they may also pose a danger to the consumer and/or to the local environment. Many chemicals found in homes have been linked to allergies, cancer, birth defects, and/or psychological abnormalities. Millions of pounds of these toxic cleaning products are poured down drains each day and are not adequately removed by the water treatment facilities. These toxic cleaning products are returned to the rivers and/or other water sources from which drinking water is obtained. The use of these synthetic surfactants and solvents results in the consumers suffering from health issues and a polluted environment.

In view of the inherent dangers posed by synthetic cleaners and the ever-increasing desire for renewable resources, recently there has been an increased demand for entirely natural cleaning compositions. However, in the past, natural based cleaning compositions have suffered from at least one of two shortcomings. Firstly, many such compositions have used all-natural ingredients but have failed to perform at the level of synthetically composed cleaners, thereby forcing consumers to choose between their health or effective cleaning. Secondly, many of these compositions have achieved similar performance to that of the synthetically composed cleaners but only use several natural ingredients in combination with several synthetic surfactants and solvents. Compositions of this latter type merely slow down or reduce the negative health and environmental effects of the toxic ingredients as opposed to eliminating them altogether.

Present day cleaning compositions also fail to combine entirely natural compositions with effective cleaning that can be competitive with synthetic cleaners. Accordingly, there is a need for a more effective natural cleaning composition which can compete with the top synthetic cleaners in terms of cleaning effectiveness and which can also be composed of almost entirely natural ingredients.

It is an object of the present invention to provide such a cleaning product.

Surface cleaners which contain surfactants, both with and without abrasives, have long been utilized for removing soils, dirt, dried urine, stubborn stains, deposit, and scum from fixtures, sinks, toilet bowls, and other fixtures. These products are particularly useful in cleaning toilets, sinks, and other surfaces, which are then rinsed with water which is discharged to the sewage collection systems, holding tanks, or septic systems.

In association with surface cleaning, the sanitization of surfaces is also desirable. By inactivating or reducing the pathogens, the chances for the transmission of disease due to indirect contacts may be eliminated or decreased. Most of the present-day sanitizing or disinfecting products contain chemicals, such as, hypochlorite, quaternary ammonium compounds, or pine oil.

Almost universally, surface cleaning and sanitizing products are highly alkaline or acidic, and the use of these products may tend to cause potential damage to beneficial microorganisms in the collection lines, septic systems, or holding tanks. In many applications, the inhibition of beneficial microbial activity is clearly a disadvantage. Furthermore, most of the available surface cleaning and sanitizing products are corrosive to materials, particularly metals, which are generally used in the construction of restroom fixtures. Some of the major sanitizing agents, such as hypochlorite, form chlorinated hydrocarbons, which may be toxic to human beings, which may be detrimental to the environment, and which may be difficult to biodegrade.

It has recently suggested that nonpathogenic microbes be used to inhibit pathogenic organisms (G. Haas, ASM News, June, 1995). The nonpathogenic microbes would be applied to locations where pathogens are present in order to inhibit the pathogens. The mechanisms involved are substrate competition, production of antibiotics, and so forth. When chemicals are used for sanitization, they tend to kill the pathogens only during application or only for a short time thereafter. In contrast, microbes, such as the beneficial microbes of this invention, can have effects on preventing the growth of pathogens over the long term. In addition, the beneficial microbes of this invention seed the connecting drain lines and waste collection and treatment systems, and enhance the degradation of organic wastes.

It is a further object of the invention is to provide a formulation which has strong surface cleaning and sanitizing properties, without being highly alkaline, acidic, corrosive, or detrimental to the environment.

Most commercial cleaning/detergent formulations are designed to efficiently clean industrial, domestic and/or communal hard surfaces, soft surfaces, including all natural, organic, synthetic and blended fibers, or organic surfaces including, but not limited to, human skin and hair and animal skin and hair, but not all four. Compositions, formulations, and solutions known in the art generally comprise a solution of surfactants having various ionic charges; in particular, surfactants that are non-ionic, anionic, cationic, or amphoteric in nature; acids; caustics; solvents; penetrating agents; oils; and/or alcohols. However, many of these formulations are harsh, and are not naturally occurring.

Other detergent/cleaner formulations known in the art include linear alkylbenzene sulfonates (LASs); such as, for example, sodium dodecylbenzenesulfonate; 2-butoxyethanol; chlorine bleach (e.g., sodium hypochlorite (NaOCl)); and other synthetic or manmade chemicals; such as, for example, glycols and non-natural surfactants and ammonia, many of which are toxic and damaging to the environment. In cases of intensive prolonged exposure, such chemicals can be toxic to those using the compositions for cleaning. Over time, the toxic effects of such compositions have become more widely known, and it has become desirable to attempt to avoid exposure to such toxic materials.

Soap is, in general, made by the combination of a fatty acid, such as those found in vegetable or animal oils, and a basic solution, such as, sodium hydroxide or lye. These elements are mixed together under the application of heat until they are neutralized in a process referred to as "saponification".

Generally, a natural soap is a soap prepared without a synthetic surfactant and with the additional of a functional element, such as a natural element and aroma oil on a small scale in the home; which can be contrasted to soaps which are manufactured on a large scale in a factory where "environmental friendliness" and "well-being" are emphasized and the harmfulness of a synthetic surfactant is highlighted.

As stated herein above, there is a need in the art to provide a more effective natural cleaning composition which can compete with the top synthetic cleaners in terms of cleaning effectiveness and which can also be composed of almost entirely natural ingredients. Also, there is a further need in the art to provide a formulation which has strong surface cleaning and sanitizing properties, without being highly alkaline, acidic, corrosive, or detrimental to the environment.

SUMMARY OF THE INVENTION

The present invention meets the above needs. The present invention provides a natural cleaning product which does not contain any harsh chemicals or toxins. More specifically, the invention provides a composition for an organic cleaning product which is comprised essentially of borax and yucca plant products.

The present invention provides a cleaning/detergent composition and formulation and/or solution comprised primarily of naturally and/or organically occurring ingredients. The composition of the invention provides an effective cleaning/detergent action on a variety of surfaces, and the composition of the invention is generally safer to use and less toxic to the user and to the environment compared to existing cleaning/detergent compositions.

A composition for an organic cleaning product of the invention is comprised of the following formulation: 10 cups of distilled water; 1 cup of borax which is dissolved in hot water; 2.75 cups of distilled white vinegar; 2 cups of yucca root soap; optionally, 1 dropper of lavender essential oil; optionally, 1 dropper of peppermint essential oil; and optionally, 1 dropper of eucalyptus.

A process for forming the yucca root soap which is part of the formulation for the composition of an organic cleaning product of the invention comprises several steps which are set forth herein below.

These and other features and advantages of the present invention will be better appreciated and understood when reading the following description.

DETAILED DESCRIPTION OF THE INVENTION

The present invention pertains to a composition for a natural cleaning product. More specifically, the present invention pertains to a composition for an organic cleaning product. The natural cleaning product of the invention is embodied in a heavy-duty cleaner containing yucca and borax products. Borax is defined by the Merriam Webster dictionary as being "a white crystalline compound that consists of a hydrated sodium borate $Na_2B_4O_7 \cdot 10H_2O$, that occurs as a mineral or is prepared from other minerals, and that is used especially as a flux, cleansing agent, and water softener, as a preservative, and as a fireproofing agent.

The Merriam Webster dictionary defines "yucca" as follows: "Yucca is any of a genus sometimes arborescent plants of the agave family that occur in warm regions chiefly of western North America and have long sword-shaped often stiff fibrous-margined leaves on a usually woody base and bear a large panicle of white blossoms . . . Yucca plants are most often found in arid, desert-like environments, such as the Southwestern United States and Northern Mexico. These hot, dry locations force the yucca plants roots to go deep into sandy and seemingly infertile soil. Yuca, otherwise known as cassava, is commonly found in more tropical locations, such as South America and Africa. Cassava grows more rapidly in these locations due to the abundant moisture and nutrient-rich soils." In the present invention, the yucca plant is used and not yuca otherwise known as cassava.

Broadly, the composition of an organic cleaning product of the invention is comprised of distilled water; borax; distilled white vinegar; yucca root soap; and optionally, lavender essential oil, peppermint oil and eucalyptus. A specific composition of an organic cleaning product of the present invention is comprised of the following formulation.

EXAMPLE 1

Formulation:

a) 10 cups of distilled water;
b) 1 cup of borax which, preferably, is dissolved in hot water;
c) 2.75 cups of distilled white vinegar;
d) 2 cups of yucca root soap;
e) 1 dropper of lavender essential oil (optional);
f) 1 dropper of peppermint essential oil (optional); and
g) 1 dropper of eucalyptus (optional).

The above ingredients are simply mixed together in an appropriate container to produce the composition for an organic cleaning product of the present invention. No particular order for adding the above ingredients is required. That is, the 10 cups of distilled water can be added to a container, followed by the one cup of borax which has been dissolved in hot water; followed by the addition of the 2.75 cups of distilled white vinegar; and then the yucca root soap; and lastly, the lavender essential oil, the peppermint essential oil, and/or the eucalyptus. These ingredients can be added in any order and the result will be the same; that is, a composition for an organic cleaning product will be produced.

A process for forming the yucca root soap used in the above formulation for forming a composition for an organic cleaning product of the invention is comprised of the following steps:

a) harvesting a desert yucca plant (*Yucca schidigera*); this includes the following two sub-steps:
   i) cutting down the yucca plant trunk and removing the bark and debris from the yucca plant trunk;
   ii) digging up the yucca root and removing the debris from the yucca root;
b) cutting the yucca plant trunk and root of steps i) and ii) into one-inch pieces;
c) running the one-inch yucca pieces of step b) underwater to remove any further debris and forming a one-pound mass of cleaned yucca pieces;
d) adding the one-pound mass of cleaned yucca pieces of step c) and 2 whole lemons to about 6 quarts of water to form a lemon-yucca mass;
e) boiling the lemon-yucca mass of step d) for about one hour to form a spongy mass;
f) draining the spongy mass of step e) in a wash container;
g) adding additional lemons to the drained spongy mass of step f) in the wash container to form a lemon-spongy mass;
h) blending water with some of the cleaned one-inch yucca pieces to form a foamy yucca mass;
i) adding the foamy yucca mass to the lemon-spongy mass in the wash container to form a lemon-foamy mass;
j) adding about 6 quarts of water to the lemon-foamy mass in the wash container of step i) to form a lemon-foamy mass;
k) boiling the watered lemon-foamy mass in the wash container to form a boiled lemon mass;
l) cooling the boiled lemon mass of step k) for about 35 minutes to form a cooled blend;
m) straining the cooled blend of step l) into a second container;
n) squeezing the lemons and water out of the cooled blend of step m) in the second container to form a second blend; and
o) straining the second blend of step n) through a piece of cheese cloth to remove additional starches and debris and to form yucca root soap.

The above steps a) through o) result in a formulation for a yucca root soap product which can then be used in the above composition for an organic cleaning product of the present invention.

The yucca root soap formed in steps a) through o) in the preceding paragraph, preferably, is refrigerated until the yucca root soap is ready for use in the formulation of the composition for an organic cleaning product of the invention. As indicated herein above, the adding of the lavender essential oil, the peppermint essential oil, and the eucalyptus is optional.

It has been found that the combination of borax with lemons and the yucca plant as prepared as described herein above to produce a yucca root soap results in a heavy-duty cleaner that is effective and environmentally friendly. It is also to be appreciated that the distilled water, the borax, the lavender essential oil, the peppermint essential oil, and the eucalyptus is readily available in the marketplace. It is also to be appreciated that the yucca root soap and/or the composition for an organic cleaning product of the invention may be produced on a small scale in the home, or on a large scale in a manufacturing plant. The equipment necessary for the production of the yucca root soap and the composition for an organic cleaning product are well known to those skilled in the art and are readily available in the marketplace.

While the present invention has been described in connection with preferred embodiments of the invention, it will be understood that other similar embodiments may be used or modifications and additions may be made to the described embodiments for performing the same function of the present invention without deviating therefrom. Accordingly, it is intended by the appended claims to cover all such changes and modifications as come within the spirit and scope of the invention.

What is claimed is:

1. A composition for an organic cleaning product, comprising:
a) distilled water;
b) borax;
c) distilled white vinegar; and
d) yucca root soap.

2. The composition of claim 1, further comprising at least one oil selected from the group of oils consisting of lavender essential oil and peppermint essential oil.

3. The composition of claim 1, further comprising eucalyptus.

4. A composition for an organic cleaning product, comprising:
a) approximately 10 cups of distilled water;
b) approximately 1 cup of borax;
c) approximately 2.75 cups of distilled white vinegar; and
d) approximately 2 cups of yucca root soap.

5. The composition of claim 4, further comprising:
e) about one dropper of a composition of oil selected from the group of oils consisting of lavender essential oil; peppermint essential oil; and eucalyptus.

6. A process of forming the yucca root soap of claim 4, the steps comprising:
a) harvesting a desert yucca plant; including the sub-steps of:
   i) cutting down the yucca plant trunk and removing the bark and debris from the yucca plant trunk;
   ii) digging up the yucca root and removing the debris from the yucca root;
b) cutting the yucca plant trunk and root of steps i) and ii) into one-inch pieces;
c) running the one-inch yucca pieces of step b) underwater to formed cleaned yucca pieces and forming a one-pound mass of cleaned yucca from the clean yucca pieces;
d) adding two whole lemons and about 6 quarts of water to the one-pound mass of the yucca pieces of step c);
e) boiling the lemon-yucca mass of step d) for about one hour to form a spongy mass;
f) draining the spongy mass of step e) in a wash container;
g) adding additional lemons to the drained spongy mass of step f) in the wash container to form a lemon-spongy mass;
h) blending water with some of the cleaned one-inch yucca pieces to form a foamy yucca mass;
i) adding the foamy yucca mass of step h) to the lemon-spongy mass in the wash container to form a lemon-foamy mass;
j) adding about 6 quarts of water to the lemon-foamy mass in the wash container of step k) to form a watered lemon-foamy mass;
k) boiling the watered lemon-foamy mass of step j) in the wash container to form a boiled-lemon mass;
l) cooling the boiled-lemon mass of step k) for about 35 minutes to form a cooled blend;
m) straining the cooled blend of step l) into a second container;
n) squeezing the lemons and water out of the cooled blend of step m) in the second container to form a second blend; and o) straining the second blend of step n) through a piece of cheese cloth to remove additional starches and debris and to form yucca root soap.

7. The process of claim 6, further comprising the step of refrigerating the yucca root soap until the yucca root soap is to be used in the formulation for forming the composition for an organic cleaning product.

8. The process of claim 6, wherein the yucca plant is *Yucca Schidigera*.

* * * * *